United States Patent [19]

Bak

[11] 4,263,411

[45] Apr. 21, 1981

[54] POLYURETHANE COMPOSITIONS AND PROCESS FOR PREPARING POLYURETHANE EMITTING REDUCED AMOUNTS OF TOXIC FUMES ON BURNING USING A COBALT, COPPER, NICKEL OR MANGANESE SALT

[75] Inventor: Eugene Bak, Polk, Pa.

[73] Assignee: Mooney Chemicals, Inc., Cleveland, Ohio

[21] Appl. No.: 77,921

[22] Filed: Sep. 28, 1979

Related U.S. Application Data

[63] Continuation-in-part of Ser. No. 955,899, Oct. 30, 1978, abandoned.

[51] Int. Cl.$^3$ .............................................. C08G 18/14
[52] U.S. Cl. .................................... 521/108; 521/123; 521/124; 521/125; 521/129; 528/51; 528/53; 528/55; 528/56; 528/57
[58] Field of Search ............... 521/108, 123, 124, 125, 521/129; 528/51, 53, 55, 56, 57

[56] References Cited

U.S. PATENT DOCUMENTS

| | | | |
|---|---|---|---|
| 3,450,648 | 6/1969 | Windemuth | 521/113 |
| 3,476,933 | 11/1969 | Mendelsohn | 521/61 |
| 3,510,439 | 5/1970 | Kaltenbach | 260/18 |
| 3,746,692 | 7/1973 | Olstowski et al. | 528/56 |
| 3,808,162 | 4/1974 | Allen et al. | 528/56 |
| 3,951,822 | 4/1976 | Brown | 252/8.1 |
| 4,125,487 | 11/1978 | Olstowski | 528/56 |

*Primary Examiner*—Maurice J. Welsh
*Attorney, Agent, or Firm*—Maky, Renner, Otto & Boisselle

[57] ABSTRACT

A process of forming polyurethane compositions which emit reduced amounts of toxic smoke on burning is described. The process comprises reacting a mixture of an organic compound having two or more active hydrogen atoms, an organic polyfunctional isocyanate, a catalyst and at least one metal salt of an aliphatic or alicyclic monocarboxylic acid wherein the metal is cobalt, copper, nickel or manganese. The metal salt is added to the mixture in an amount which is sufficient to reduce the formation of toxic substances when the polyurethane is ignited.

30 Claims, No Drawings

POLYURETHANE COMPOSITIONS AND PROCESS FOR PREPARING POLYURETHANE EMITTING REDUCED AMOUNTS OF TOXIC FUMES ON BURNING USING A COBALT, COPPER, NICKEL OR MANGANESE SALT

CROSS REFERENCE TO RELATED APPLICATION

This application is a continuation-in-part of co-pending application Ser. No. 955,899, filed Oct. 30, 1978 now abandoned.

BACKGROUND OF THE INVENTION

The present invention relates to polyurethane compositions, and more particularly, to polyurethane foams, polyisocyanurates, elastomers, coatings and adhesives exhibiting reduced toxic smoke emission on burning. The invention also relates to a method of providing polyurethane compositions having these desirable properties.

Polyurethane compositions are produced in a variety of forms including rigid and flexible foams, polyisocyanurates, elastomers, coatings and adhesives. It is well known that polyurethane compositions can be prepared by reacting an organic polyfunctional isocyanate with an organic compound having two or more reactive hydrogen atoms such as are found on polyesters, polylkylene polyols, polyester amides, polyalkylene ethers, polyacetals and polyalkylene thioethers. When the reaction is conducted under anhydrous conditions, the resulting polyurethane may be non-porous. Urethane elastomers generally are prepared from a diisocyanate, a linear polyester or polyether resin, and a low molecular weight curing agent such as a glycol or a diamine. If a cellular or foamed polyurethane is desired, gas-generating additives such as water or other blowing agents are included in the reaction mixture. Generally, flexible urethane foams are prepared from polyether or polyester resins, an excess of diisocyanate and water. The water reacts with the excess isocyanate groups not previously reacted with the polyether or polyester, and carbon dioxide is formed which is entrapped in the reaction mixture. Auxiliary blowing agents such as volatile hydrocarbons and fluorocarbons also may be employed, and generally are preferred when rigid foams are produced.

It is well known that various materials may be employed as catalysts or activators in the formation of polyurethanes. The most common of the catalysts are the amines, typically tertiary amines such as triethylene diamine. Although the amines are the most commonly used catalysts, they generally are considered to be undesirable because they exhibit high volatility which results in a high rate of loss from the reaction mixture, obnoxious odors and toxicity. Despite these problems, the amines continue to be commonly employed because there are few satisfactory substitutes.

A wide variety of metal catalysts has been suggested for preparing flexible polyurethane foams. See, for example, *Polyurethanes: Chemistry and Technology Part II,* Saunders and Frisch, Interscience Publishers 1964, pages 21-25 where the catalytic activity of various sodium, lead, iron, tin, copper, manganese, cadmium, cobalt, etc. compounds, particularly salts are discussed. Studies of the activity of various catalysts for rigid foam systems are discussed in the same book at pages 217-219. Tertiary amines and tin compounds such as stannous octoate and dibutyl tin dilaurate are reported to be useful. Additives useful as flame retardants in rigid urethane foams are described on page 223 of the same book and these additives include metal soaps such as zinc stearate, calcium oleate and zinc laurate.

U.S. Pat. No. 3,884,849 describes low density, flexible and semi-flexible urethane foams which contain, in addition to the usual reactants, a small amount of a solid chlorine-containing polymeric resin, zinc oxide and a zinc salt of an organic monocarboxylic acid. The zinc salt is added to the formulation prior to foaming and is added in addition to the normal catalyst. The zinc salt reduces or prevents discoloration of the urethane foam. It is also suggested to use a catalyst combination of a tertiary amine and a metal containing co-catalyst. Non-yellowing polyurethanes also are described in U.S. Pat. No. 3,580,873 wherein isocyanate-terminated prepolymers are reacted with a mixture of monoethanolamine and triethanolamine in the presence of a catalytic amount of a metal drier such as calcium-, zinc-, or lead naphthenate or octoate. U.S. Pat. 3,746,692 describes the preparation of polyurethane compositions by reaction of a polyether polyol with an organic polyisocyanate, a liquid halogen-containing aliphatic modifier compound and one or more organometallic catalysts for urethane formation. Cobalt naphthenate is listed as an example of a catalyst. U.S. Pat. No. 3,808,162 describes the preparation of urethanes using a mixture of a soft acid metal compound such as tin or cobalt octoate with a carboxylic acid having a $pK_a$ greater than 0.23, for example 2-ethylhexanoic acid. U.S. Pat. No. 4,125,487 relates to the formation of polyurethane-vinyl polymers which utilizes a free radical catalyst for the vinyl polymerization and a cobalt salt for the urethane formation.

British Pat. No. 980,139 describes a process for manufacturing foamed polyurethane materials from a mixture of an organic polyisocyanate, a polymer containing secondary hydroxyl end groups in the presence of catalysts normally used for preparing foams and a zinc salt of a carboxylic acid. It is reported that the use of the zinc carboxylates in conjunction with known catalysts results in decreased reaction time, decreased surface drying time and products having improved physical properties. U.S. Pat. No. 3,347,804 describes a catalyst for preparing urethane foams which comprises a combination of tin, lead and zinc salts.

The above-described prior art represents a sampling of the suggestions which have been made for improving the properties of urethane foams. In spite of the numerous suggestions made in the prior art, research has continued towards developing polyurethane compositions having increased flame retardancy, and more recently, increased efforts have been directed towards developing polyurethane foams which exhibit a reduction in the emission of toxic fumes when burned.

SUMMARY OF THE INVENTION

An improvement in the preparation of polyurethane compositions including polyurethane adhesives, coatings, elastomers and foams which results in compositions exhibiting reduced toxic smoke emission on burning is described. More particularly, the invention relates to polyurethane compositions exhibiting reduced toxic smoke emission on burning which are formed by reacting a mixture comprising an organic compound having at least two active hydrogen atoms, an organic polyfunctional isocyanate and a catalyst wherein the improvement comprises the addition to said mixture prior to reaction, of a cobalt, copper, nickel or manganese salt of an aliphatic or alicyclic monocarboxylic acid in an amount effective to reduce the formation of toxic substances when the polyurethane composition is ignited.

It has been discovered that the amount of toxic smoke emitted by polyurethane compositions on burning is reduced when these salts are included in the composition in addition to the catalyst normally used to form the urethane compositions.

DESCRIPTION OF THE PREFERRED EMBODIMENTS

It now has been found that the amount of toxic smoke generated when polyurethane compositions are burned can be reduced significantly by including in the mixture used to form the polyurethane compositions, a cobalt, copper, nickel or manganese salt of an aliphatic or alicyclic monocarboxylic acid. The salt is included in the reaction mixture in addition to the catalysts which are normally used in the formation of polyurethane compositions. Thus, the polyurethane compositions of the invention are prepared by reacting a mixture comprising an organic compound having active hydrogen atoms, an organic polyfunctional isocyanate, a catalyst, and a cobalt, copper, nickel or manganese salt of an aliphatic or alicyclic monocarboxylic acid.

The polyurethane compositions may be adhesives, elastomers, coatings, rigid and flexible foams.

The cobalt, copper, nickel and manganese salts which are useful in the preparation of the polyurethane compositions of the invention can be the normal or basic salts of one or more aliphatic or alicyclic monocarboxylic acids. The monocarboxylic acids preferably contain from about 6 to 20 carbon atoms, and the salts can be prepared from a single monocarboxylic acid or a mixture of carboxylic acids. Examples of monocarboxylic acids which can be used to prepare the metal salts which are useful in the invention include hexanoic acid, heptanoic acid, ethyl-hexanoic acid, neodecanoic acid, stearic acid, oleic acid, naphthenic acid, etc.

Some specific examples of the salts useful in the invention include cobalt palmitate, cobalt octoate, cobalt oleate, cobalt neodecanoate, cobalt naphthenate, cobalt stearate, copper octoate, copper neodecanoate, copper naphthenate, nickel octoate, nickel neodecanoate, nickel naphthenate, nickel stearate, manganese octoate, manganese neodecanoate, manganese naphthenate and manganese stearate.

As mentioned above, the salts may be either normal salts or basic salts. The basic salts have a stoichiometric excess of the metal relative to the acid as compared with neutral or normal metal salts of the acid. For example, solutions of normal cobalt salts of monocarboxylic acids such as neodecanoic acid contain about 6% cobalt whereas a solution of a basic cobalt neodecanoate can contain up to about 26% or more of cobalt. A discussion of the preparation of basic cobalt salts, particularly cobaltous neodecanoate is contained in U.S. Pat. No. 3,723,152. Highly overbased cobalt, copper, nickel and manganese compositions containing as much as 60% of the metal also are useful in the invention. The highly overbased cobalt, copper, nickel and manganese compositions consist essentially of a metal oxide and a hydroxyl-metal-carboxylate or -sulfonate complex wherein the metal content is in chemical combination partly with oxygen in a polynuclear metal oxide crystallite core and partly with at least two different aliphatic or alicyclic monocarboxylic acids or a mixture of one or more aliphatic or alicyclic monocarboxylic and aliphatic or aromatic monosulfonic acids containing at least two carbon atoms as hydroxyl-metal-carboxylate and hydroxy-metal-sulfonate groups, at least one of the acids being a monocarboxylic acid containing at least seven carbon atoms, and when the second acid is also a monocarboxylic acid, the second acid contains a number of carbon atoms in its longest chain differing by at least two carbon atoms from the total number of carbon atoms in the other, at least a portion of the carboxylate and sulfonate groups being hydrogen-bonded to oxygen atoms of the core, and the remainder of the carboxylate and sulfonate groups are unbonded and in equilibrium with the bonded groups, and the ratio of total metal moles to the total moles of organic acid is greater than one. Such overbased compositions are described in U.S. Pat. No. 4,162,986, and the disclosure of said patent is hereby incorporated by reference.

Normal, basic and the highly overbased metal salts have been described in the prior art and are available commercially such as from Mooney Chemicals, Inc., Cleveland, Ohio. Solutions of cobalt neodecanoate and manganese neodecanoate are available under the trademark "TEN-CEM"; solutions of cobalt, copper, nickel and manganese salts prepared from a blend of synthetic domestic acids are available under the trademark "CEM-ALL"; solutions of cobalt, nickel and manganese salts of 2-ethylhexanoic acid are available under the designation "HEX-CEM"; and cobalt, copper and manganese naphthenates are available under the trademark "NAP-ALL".

The amount of the metal salt included in the reaction mixture used to form polyurethane compositions can be varied depending on the other components of the reaction mixture and in particular the nature of the catalyst employed. If the catalyst is one which itself contributes to the formation of toxic fumes on burning, then larger amounts of the salts may be beneficial. In general, the amount of cobalt, copper, nickel and manganese salt included in the reaction mixture will be such as to provide a metal concentration, based on the polyol (or other compound containing active hydrogen) of up to about 2 to 3 grams of cobalt, copper, nickel or manganese per 100 gms. of polyol. Amounts of metal ranging from about 0.05 gm. to about 3 gms. are particularly useful.

The polyurethane compositions which are treated in accordance with the method of the invention are prepared by reacting a mixture comprising an organic compound having two or more active hydrogen atoms and an organic polyfunctional isocyanate. The organic compounds having two or more active hydrogen atoms (as determined by the Zerewitinoff method) are compounds having at least one hydroxyl group such as polyethers, polyols and polyesters. In addition to the hydroxyl group, the active hydrogen atoms may be found on amino and carboxyl groups. Polyurethane adhesives generally are prepared from polyesters and diisocyanates. Such adhesives are useful particularly for bonding rubber to fibers as well as metals. Another type of urethane adhesive is obtained by preparing polymers of polyvinyl alcohol modified with diisocyanates.

Polyurethane coatings have been prepared from a variety of reactants, and polyester-diisocyanate coatings have been found to be suitable for substrates such as wood, rubber, leather, fabrics, paper, and metals. By varying the type and degree of branching of the polyester and of the diisocyanate, as well as the NCO/OH ratio, a wide variety of properties has been obtained ranging from very flexible to very hard and brittle films. Although the method of the present invention is applicable to adhesives, elastomers, coatings, and foams, the following discussion of the preferred embodiments will be directed primarily to polyurethane foams. Much of the discussion is applicable equally to urethane adhesives, elastomers and coatings.

The polyols used in making polyurethanes are generally primary and secondary hydroxyl-terminated polyoxyalkylene ethers having from 2 to 4 hydroxyl groups and a molecular weight of from about 200 to 10,000. They are liquids or are capable of being liquefied or melted for handling in the polyurethane foaming apparatus or machine.

Examples of polyoxyalkylene polyols include linear and branched polyethers having a plurality of ether linkages and containing at least two hydroxyl groups and being substantially free from functional groups other than hydroxyl groups. Among the polyoxyalkylene polyols which are useful in the practice of this invention are the polypropylene glycols, the polypropylene-ethylene glycols, and the polybutylene glycols. Polymers and copolymers of alkylene oxides are also adaptable in the process of this invention as well as the block copolymers of ethylene oxide and propylene oxide and the like. Among the polymers and copolymers that deserve some special mention are the ethylene oxide, propylene oxide and butylene oxide adducts of ethylene glycol, propylene glycol, diethylene glycol, dipropylene glycol, triethylene glycol, 2-ethylhexanediol-1,3, glycerol, 1,2,6-hexanetriol, trimethylolpropane, trimethylolethane, pentaerythritol, triethanolamine, triisopropanolamine, ethylenediamine, and ethanolamine. Linear and branched copolyethers of other alkylene oxides are also useful in making the products of this invention as well as the polypropylene diols, triols and tetrols end-blocked with ethylene oxide to provide primary hydroxyl groups in the polymer and having molecular weights of from about 2,000 to 5,000.

Branched polyethers have the advantage of making possible cross linking without the interaction of urea or urethane groups with the isocyanate groups. This has the advantage of making a larger proportion of the isocyanate used available for the evolution of carbon dioxide and the reducing of the overall amount of isocyanate that is required in the preparation of the polymer. Mixtures of polyether polyols can be used.

The organic polyols which are useful in the preparation of the rigid polyurethanes of the invention preferably are tetrafunctional polyether polyols and polyether polyols of higher functionality which can be prepared by the reaction of an alkylene oxide such as ethylene oxide, propylene oxide or butylene oxide with a polyol having 4 or more available hydroxyl groups. Typical tetrafunctional and higher functional polyether polyols are prepared by the oxyalkylation of polyols such as the following: pentaerythritol, sucrose, 2,2,6,6-tetrakis (hydroxymethyl) cyclohexanol, glucose, sorbitol, mannitol, degraded starches, degraded cellulose, diglycerol, alpha-methyl glucoside and the like. When such polyether polyols are utilized in the rigid polyurethane foams of this invention, they should have a hydroxyl number in excess of about 200 and preferably in excess of about 250, with the best results ordinarily being achieved from those polyether polyols having hydroxyl numbers in excess of about 300.

When desired, cross-linking materials having from 2 to 8 hydroxyl groups can be included in the foam formulation to increase cross link density. They have molecular weights of from about 60 to 600. Only small amounts of such materials are generally needed (about 0.3 to 10 mols per 100 mols of polyol). Examples of such crosslinking agents are ethylene glycol, diethylene glycol, propylene glycol, butane diol-1,4, dipropylene glycol, glycerol, trimethylolpropane, butane triols, hexanetriols, tri-methylolphenol, various tetrols, such as erythritol and pentaerythritol, pentols, hexols, such as dipentaerythritol and sorbitol, as well as alkyl glucosides, carbohydrates, polyhydroxy fatty acid esters such as castor oil and polyoxy alkylated derivatives of polyfunctional compounds having three or more reactive hydrogen atoms, such as, for example, the reaction product of trimethylolpropane, glycerol, 1,2,6-hexanetriol, sorbitol and other polyols with ethylene oxide, propylene oxide, or other alklene epoxides or mixtures thereof, e.g., mixtures of ethylene and propylene oxides.

In addition to the aliphatic polyols and the polyether polyols, polyester resins containing hydroxyl groups may be utilized to prepare useful rigid polyurethane foams. Suitable polyester resins may be prepared by reacting an excess of polyol with a polycarboxylic acid, especially dicarboxylic acids. Typical polyols include: ethylene glycol, propylene blycol, butylene glycol, glycerol, trimethylolpropane, trimethylolethane, 1,2,6-hexanetriol, pentaerythritol, diethylene glycol, dipropylene glycol and the like. Typical carboxylic acids include: adipic acid, succinic acid, azaleic acid, phthalic acid, isophthalic acid, terephthalic acid, chlorendic acid and tetrabromophthalic acid. Long chain dimer acids may be used to form useful polyols by esterification with polyols, especially diols such as ethylene glycol and the like. For the purposes of this invention, useful polyesters should have a minimum hydroxyl number of about 200, and preferably above about 250, with the best results being obtained from those polyesters having hydroxyl numbers in excess of about 300.

Another useful class of polyols which can be employed are the trialkanolamines which, by reaction with alkylene oxides, form adducts of suitable molecular weight, and the alkylene oxide adducts thereof. Illustrative of the lower molecular weight trialkanolamines include triethanolamine, triisopropanolamine and tributanolamine. The alkylene oxide adducts which can be employed are preferably those wherein the oxyalkylene moieties thereof have from 2 to 4 carbon atoms.

Alkylene oxide adducts of mono- and polyamines and also ammonia can be used as polyols. These may be termed aminic polyols. The mono- and polyamines are preferably reacted with alkylene oxides which have 2 to 4 carbon atoms; for example, ethylene oxide, 1,2-epoxypropane, the epoxybutanes, and mixtures thereof. Mono- and polyamines suitable for reaction with alkylene oxides include, among others, methylamine, ethylamine, isopropylamine, butylamine, benzylamine, aniline, the toluidines, naphthylamines, 1,3-butanediamine, 1,3-propanediamine, 1,4-butanediamine, 1,2-, 1,3-, 1,4-, 1,5-, and 1,6-hexanediamine, phenylenediamines, toluene-diamines, naphthalenediamines and the like. Among the compounds of the above groups which are of particular interest are, among others, N,N,N',N'-tetrakis (2-hydroxypropyl) ethylenediamine; N,N,N',N'-tetrakis (2-hydroxypropyl) diethylenetriamine; phenyldiisopropanolamine and higher alkylene oxide adducts of aniline, and the like. Others which deserve particular mention are the alkylene oxide adducts of aniline or substituted aniline/formaldehyde condensation products.

Another material which may be present in the polyurethane of this invention is castor oil and its derivatives. Also useful are the oxyalkylation products of polyaminepolyamide compounds as obtained by the reaction of dicarboxylic acids with polamines.

The organic polyisocyanates which can be reactd with organic polyols to form rigid polyurethane foams include aliphatic, alkylaromatic and aromatic polyisocyanates. Typical organic polyisocyanates include aromatic polyisocyanates such as 2,4- and 2,6-toluene diisocyanate, 2,2'-, 2,4'-, 4,4'-diphenylmethane-diisocyanate, triphenylmethane-triisocyanate, biphenyl-diisocyanate, m- or p-phenylene-diisocyanate and 1,5-naphthalene-diisocyanate and aliphatic polyisocyanates such as isophorone-diisocyanate, 1,4-tetramethylene diisocyanate and hexamethylene diisocyanate, Preferred are the toluene diisocyanates and mixtures of 2,2'-, 2,4'-, and 4,4'-diphenylmethane diisocyanate and polyphenylpolymethylene-polyisocyanates. The polyisocyanates may be used individually or as mixtures.

Good results are obtained when polymeric polyisocyanates having a functionality greater than 2.0 are utilized. Exemplary polyisocyanates include the following: crude diphenylmethane-4,4-'diisocyanate, commonly referred to as crude MDI having a functionality of about 2.5 to 2.6; crude toluene diisocyanate, commonly referred to as crude TDI, containing about 85 percent TDI and about 15 percent polymeric isocyanate and having a functionality of about 2.1; and polymethylene polyphenyl isocyanate, referred to as PAPI, having an isocyanate functionality greater than 2.4.

The polyisocyanate is used in an amount sufficient to react with the active hydrogen atoms (as determined by the Zerewitinoff method, J.A.C.S. Vol. 49, p. 3181 (1927)) in the polyols or polyester etc., crosslinkers, water and any other active hydrogen-containing material in the polyurethane foam formulation to provide the desired degree of cross-linking, chain extension, urea groups, blowing and so forth to obtain the desired flexibility, rigidity, strength and/or other physical properties.

To impart a foamed or cellular structure to the blended polyol-or polyester-polyisocyanate mixture, a suitable blowing agent is added or produced in situ. The liquid but relatively volatile halocarbons, such as the following halocarbons containing 1, 2 or even up to 4 carbon atoms, are especially desirable for the purpose. These include the following: methylene chloride, trichloromonofluoromethane, dichlorodifluoromethane, dichloromonofluoromethane, bromotrifluoromethane, chlorodifluoromethane, 1,1-dichloro-1-fluoroethane, 1,1-difluoro-1,2,2-trichloroethane, chloropentafluoroethane, 1-chloro-1-fluoroethane, 1-chloro-2-fluoroethane, 1,1,2-trichloro-1,2,2-trifluoroethane, 1,1,1-trichloro-2,2,2-trifluoroethane, 2-chlorononafluorobutane, hexafluorocyclobutene, and octafluorocyclobutane. Still other easily vaporizable fluorocarbons can be used. Mixtures of the fluorocarbons can be used. Still other blowing agents can be used in full or partial replacement of the fluorocarbons such as propane, butane, pentane, pentene, hexane and so forth, and mixtures thereof, particularly where precautions are taken to prevent explosions or where removal of the gases is provided.

The halocarbons having one and two carbon atoms are preferred, and of these, trichloromonofluoromethane and dichlorodifluoromethane are particularly useful in commercial preparations. The blowing agents are added as liquids in quantities of about 10 percent or less to about 30 percent or more, by weight of the total resin to the blended polyol-polyisocyanate mixtures, or to one or more components thereof, and are substantially volatilized in the liquid mixture at or below the temperature of the foaming mass to effect cellulation. Subsequently, the mixture cures to a hardened cellular state.

Although the halocarbons are especially desirable as blowing agents when exceptional insulative properties are desired, other blowing agents such as water can be used in this invention. Water is employed in amounts of from about 1.0 to 6.5 parts by weight per 100 parts by weight of the polyol or polyester.

Catalysts for the polyetherpolyol- or polyester-polyisocyanate reaction can be any catalyst heretofore used in the art. Examples of such catalysts are (1) tertiary phosphines such as trialkylphosphines, dialkylbenzylphosphines, and the like; (2) strong bases such as the alkali and alkaline earth metal hydroxides, alkoxides, and phenoxides; (3) acidic metal salts of strong acids such as stannic chloride, stannous chloride, antimony trichloride, bismuth nitrate, bismuth chloride, and the like; (4) alcoholates and phenolates of various metals such as $Ti(OR)_4$, $Sn(OR)_2$, $Al(OR)_3$, and the like, wherein R is alkyl or aryl, and the reaction products of alcoholates with carboxylic acids, beta-diketones and 2-(N,N-dialkylamino) alkanols, such as the well known chelates of titanium obtained by said or equivalent procedures; (5) organo-metallic derivatives of tetravalent tin, trivalent and pentavalent As, Sb, and Bi, and metal carbonyls of iron and cobalt; and (6) alkali and alkaline earth metal salts of aliphatic and alicyclic monocarboxylic acids. These catalysts are used in an amount of from about 0.1 to 0.9 part by weight per 100 parts by weight of the polyetherpolyol. It is less preferable to use those catalysts, such as the metal salts, alcoholates, hydroxides, alkoxides and phosphines, especially in large amounts, where resins containing ester groups in a substantial amount are used since they tend to hydrolize the ester linkages thereby causing scission of the backbone polymer chain and impairing of the physical and chemical properties of the resultant foams, especially under conditions of high temperature and humidity.

At least one organic tertiary amine may be included in the reaction mixture as a catalyst. The amount of organic amine catalyst may comprise, per 100 parts by weight of organic polyol, about 0.05 to 3.2 parts by weight.

In the urethane compositions of the invention there may be used a wide variety of organic tertiary amine catalysts. Such organic amines, include, among others, triethylene diamine, triphenyl amine, triethylamine, N,N,N',N'-tetramethyl-1,3-butane diamine, N-methyl morpholine, N-ethyl morpholine, N-acetyl morpholine, N-octyl morpholine, N-coco morpholine, N-phenyl morpholine, N-hydroxyl ethyl morpholine, N-hydroxyl methyl morpholine, 4,4'-dithiodimorpholine, dimethyl piperazine, N,N,N'N'-tetramethyl propane diamines, trimethyl aminoethyl piperazine, N,N-dimethyl ethanolamine, dimethyl hexadecylamine, 1-(2-ethyl-1-hexenyl) piperazine, tri-n-octylamine, trimethylamine, N,N-dimethyl benzyl amine, triethanolamine, 1,2,4-trimethylpiperazine, N-methyl dicyclohexylamine, and mixtures thereof. The sterically hindered organic tertiary amines, such as methyl dicyclohexylamine, especially those disclosed in U.S. Pat. No. 3,718,611, also can be employed in the foam formulation if desired.

In order to obtain relatively uniform distribution of the various components of the liquid system and to achieve proper cellulation, an emulsifier and/or surfactant may be incorporated into the mixture. These materials are physical in their effect and are not always necessary, especially if denser foams are desired.

Examples of surfactants which may be used include the so-called Pluronics, which have been described as being condensates of ethylene oxide with a hydrophobic base formed by condensing propylene oxide with propylene glycol. These are of a molecular weight in a range of about 2000 to about 8000 and are generally agreed to have the structure:

$$HO(C_2H_4O)_n(C_3H_6O)_n(C_2H_4O)_nH$$

wherein each n is independently an integer equal to at least one.

Another class of surfactants comprises the so-called Tetronics, which are formed by the addition of propylene oxide to ethylene diamine, followed by the addition of ethylene oxide. These compounds have been ascribed the structure:

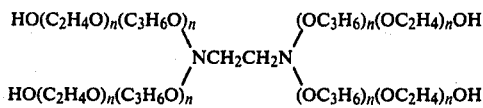

wherein each n also is independently an integer equal to at least one.

Another valuable class of surfactants comprises the so-called Tweens, which are described as the mono- and polyesters of higher fatty acids, represented by lauric acid, palmitic acid, stearic acid and oleic acid, and polyoxyethylene sorbitan.

Another type of surfactant which has been found very effective in maintaining the cell structure in the foaming and curing of polyurethane resins comprises soluble, liquid derivatives of the silicones. A variety of silicone surfactants is available commercially such as from Dow Corning.

The surfactants may be employed in amounts within a range of about 0.1 to about 3 percent by weight based upon the organic polyisocyanate content. In relatively dense foams, for example, those having a density of about 5 or 6 pounds per cubic foot, the surfactants may be omitted entirely.

Flame retardant compositions can be added to rigid foam formulations if desired. The principal types of flame retardants are non-reactive solids and liquids, and many of these are known in the art. Antimony trioxide, halogenated organo-phosphorous compounds, halogenated paraffins, halogenated polyolefins, halogenated biphenyls, halogenated bisphenols, halogenated cyclopentadienes, and dicyclopentadienes are examples of flame retardant compositions for polyurethanes which have been described in the prior art. Amounts up to about 6 percent by weight of the foam reactant mixture have been found to be useful.

Formation of the polyurethane compositions of this invention may be accomplished in a one-shot system by reacting the polyol or polyester with excess polyfunctional isocyanate in the presence of blowing agent and cell modifying agents, e.g. silicones such as trimethyl end-blocked dimethyl polysiloxanes. The mixing of the constituents may be carried out at elevated temperatures or at room temperature.

In a typical two-step operation, the polyol or polyester may be reacted with excess polyfunctional isocyanate in the absence of water. Subsequently water and other agents may be added to the mixture.

Specific examples of the various commercially available materials which can be utilized in the preparation of the polyurethane compositions of the invention are described in Tables I and IA.

TABLE I

COMMERCIAL MATERIALS

| NAME | DESCRIPTION | EQUIV. WEIGHT | HYDROXYL NO. | SOURCE |
|---|---|---|---|---|
| GLYCOLS | | | | |
| Pluracol PeP 450 tetraol | poly (oxypropylene) derivative of pentaerythritol | 100.5 | 558 | BASF Wyandotte |
| Pluracol PeP 650 tetraol | poly (oxypropylene) derivative of pentaerythritol | 150.4 | 373 | BASF Wyandotte |
| Niax Polyol 16-46 | ethylene oxide-propylene oxide polyol | 119.4 | 47 | Union Carbide |
| Pluracol 355 tetraol | poly (oxypropylene) derivative of ethylene diamine | 124.7 | 450 | BASF Wyandotte |
| Niax BDE 435 | sucrose polyether polyol | 124.9 | 449 | Union Carbide |
| Pluracol Polyol 655 | amine based polyol | 179.2 | 313 | BASF Wyandotte |
| ISOCYANATES | | | | |
| Mondur MR | polymeric isocyanate containing p,p'-diphenylmethane diisocyanate, functionality of 2.5–2.6 | 133.3 | | Mobay Chemicals |
| PAPI 27 | polymethylene polyphenyl isocyanate | 133.5 | | Upjohn Chemical Company |

TABLE 1A

COMMERCIAL MATERIALS

| NAME | DESCRIPTION | SOURCE |
|---|---|---|
| CATALYSTS | | |
| Dabco 80-20 | blend of 20% of 1,4-diazabicyclo [2,2,2] octane in 80% dimethyl aminoethanol | Air Products and Chemical Company |
| METAL SALTS | | |
| 6% Cobalt Nap-All | cobalt salt of naphthenic acid in mineral spirits (6% Co) | Mooney Chemicals |
| 12% Cobalt Hex-Cem | cobalt salt of 2-ethyl hexanoic acid in mineral spirits (12% Co) | Mooney Chemicals |
| 12% Cobalt Cem-All | cobalt salt of blend of synthetic acids in mineral spirits (12% Co) | Mooney Chemicals |
| 16% Cobalt Ten-Cem | cobalt salt of neodecanoic acid (16% Co) | Mooney Chemicals |
| 36% Cobalt Cem-All | cobalt salt of a blend of synthetic acids in mineral spirits (36% Co) | Mooney Chemicals |
| 12% Copper Cem-All | copper salt of blend of synthetic acids in mineral spirits (12% Cu) | Mooney Chemicals |
| 8% Copper Nap-All | copper salt of naphthenic acid in mineral spirits (8% Cu) | Mooney Chemicals |
| 12% Manganese Cem-All | manganese salt of a blend of synthetic acids in mineral spirits (12% Mn) | Mooney Chemicals |
| 40% Copper Cem-All | copper salt of blend of synthetic acids in mineral spirits (40% Cu) | Mooney Chemicals |
| 50% Nickel Cem-All | nickel salt of blend of synthetic acids in mineral spirits (50% Ni) | Mooney Chemicals |
| 40% Manganese Cem-All | manganese salt of blend of synthetic acids in mineral spirits (40% Mn) | Mooney Chemicals |
| OTHERS | | |
| DC-193 | silicone surfactant | Dow Corning |
| L-5340 | silicone surfactant | Union Carbide |
| Freon 11B | trichlorofluoromethane | DuPont |

In the examples of polyurethane foams summarized in the following tables, the foams are prepared by the following general procedure using the following formulation.

| | |
|---|---|
| Pluracol Pep 450 | 100 g. |
| Mondur MR | 138.3 g. |
| Freon 11-B | 30 g. |
| DC-193 | 1.5 g. |
| Catalyst | variable |
| Co, Cu, Ni or Mn salt | variable |

The desired amount of isocyanate is weighed in a polyethylene beaker. The polyol also is weighed in a beaker and the other additives added to the polyol. The isocyanate and polyol components are blended and mixed with a high speed stirrer for ten seconds. The mixture is poured into a cake box, and the cream time, rise time and tack free time are recorded. After the exotherm ceases, the foam is placed into an oven at about 100° C. for 24 hours of post curing. The foam is then cooled and conditioned at room temperature for 6 to 7 days before it is cut with a band saw into the desired sizes for testing.

The effectiveness of a particular catalyst and salt combination is determined by measuring (1) cream time, (2) the time required for the mixed foam components to rise (rise time) and (3) the time required for the foam to become non-sticky (tack free time). In the experiments below, the time of mixing all ingredients is taken as zero time. The rise time is determined by measuring the time (in seconds) required for the foam to reach its final height. The tack free time is taken to be the time (in seconds) required for the foam to become non-sticky when contacted with a paper towel. The control examples in the following tables utilize the commercially available and generally used amine catalyst Dabco R-8020 without metal salt for reference and comparison purposes.

TABLE II

| | EXAMPLES | | | | | | | | | |
|---|---|---|---|---|---|---|---|---|---|---|
| ADDITIVES | CONTROL A | 1 | 2 | 3 | 4 | CONTROL B | 5 | 6 | 7 | 8[3] |
| Dabco R-8020[1] | 1.75 | 1.75 | 1.75 | 1.75 | 1.75 | 3.0 | 3.0 | 3.0 | 3.0 | 3.0 |
| 12% Co Hex-Cem (%)[2] | — | 0.25 | — | — | — | — | — | — | — | — |
| 36% Co Cem-All (%)[2] | — | — | 1.0 | 0.75 | 0.50 | — | — | — | — | — |
| 12% Co Cem-All (%)[2] | — | — | — | — | — | — | 0.25 | 0.125 | 0.060 | 0.375 |
| Cream Time (sec) | 53 | 16 | 12 | 22 | 42 | 37 | 16 | 18 | 20 | — |
| Rise Time (sec) | 135 | 26 | 43 | 55 | 77 | 99 | 31 | 46 | 52 | — |
| Tack Free Time (sec) | 139 | 30 | 45 | 58 | 79 | 94 | 26 | 34 | 46 | — |
| Density (pcf) | 2.10 | 1.93 | 1.85 | 1.95 | 1.90 | 2.10 | 1.93 | 2.04 | 1.97 | — |
| Friability (%) | 10.2 | 11.0 | 9.0 | 9.0 | 8.5 | 9.7 | 11.6 | 5.4 | 6.1 | — |

[1] Percent catalyst based on polyol
[2] Percent cobalt metal based on polyol
[3] Sample prepared for flame combustion test

TABLE IIA

| ADDITIVES | CONTROL C | 9 | 10 | 11 | 12 | 13 | 14 | 15 | 16 | 17 | 18 |
|---|---|---|---|---|---|---|---|---|---|---|---|
| Dabco R-8020[1] | 1.5 | 1.5 | 1.5 | 1.5 | 1.5 | 1.5 | 1.5 | 1.5 | 1.5 | 1.5 | 1.5 |
| 12% Cu Cem-All(%)[2] | — | — | 0.48 | — | — | — | — | — | — | — | — |
| 40% Cu Cem-All(%)[2] | — | — | — | 0.3 | 0.8 | 1.2 | 1.6 | 2.8 | — | — | 0.8 |
| 12% Co Cem-All (%)[2] | — | — | — | — | — | — | — | — | 0.48 | — | — |
| 40% Mn Cem-All(%)[2] | — | — | — | — | — | — | — | — | 1.2 | — | 0.8 |
| 50% Ni Cem-All(%)[2] | — | — | — | — | — | — | — | — | — | 1.0 | — |
| Cream Time (sec) | 60 | 64 | 63 | 72 | 84 | 80 | 66 | 18 | 90 | 105 | 72 |
| Rise Time (sec) | 141 | 108 | 126 | 132 | 144 | 124 | 111 | 24 | 198 | 162 | 120 |
| Tack Free Time (sec) | 156 | 110 | 127 | 144 | 168 | 130 | 126 | 24 | 240 | 170 | 122 |

[1]Percent catalyst based on polyol
[2]Percent metal based on polyol

TABLE IIB

| ADDITIVES | 19 | 20 | 21 | 22 |
|---|---|---|---|---|
| Dabco R-8020[1] | 0.50 | 0.50 | 0.50 | 0.50 |
| 8% Cu Nap-All[2] | 0.50 | — | — | — |
| 12% Co Cem-All[2] | — | 0.25 | 0.50 | — |
| 12% Mn Cem-All[2] | — | — | — | 0.25 |
| Cream Time (sec) | 63 | 31 | 16 | 31 |
| Rise Time (sec) | 107 | 90 | 36 | 70 |
| Tack Free Time (sec) | 91 | 142 | 56 | 82 |

[1]Percent catalyst based on polyol
[2]Percent metal based on polyol

The polyurethane foam compositions of the invention which have been prepared with a catalyst and a cobalt, copper, nickel or manganese salt exhibit desirable and improved combustion properties. More specifically, the polyurethane foams of the invention generate combustion products containing reduced amounts of toxic substances such as hydrogen cyanide and carbon monoxide when compared to the combustion products of urethane foams cured with the generally accepted Dabco type catalyst.

The combustion and combustion gas characteristics of the foams recorded in Table III were determined in the following manner at the Flammability Research Center of the University of Utah. Test samples of about 1.6 grams are prepared and combusted in a Dow Utah (DU) chamber. The furnace on the DU chamber consists of a cubical box approximately 22 cm. on a side containing a nichrome wire heat source that is surrounded by a ceramic sleeve and a fire brick. The nichrome wire heater is wrapped around a stainless-steel cylindrical cup with a 6 cm. inner diameter. A quartz beaker fits inside the cylindrical cup to eliminate contact of the sample or combustion products with hot stainless-steel surfaces. The furnace is controlled by a pyrometer that monitors the temperature via a thermocouple inserted in the quartz cup. The chamber itself is constructed of Plexiglass and Teflon and has a volume of 64 liters.

The temperature of the furnace is set at a temperature about 50° C. higher than the temperature required to support flaming combustion as determined previously on a sample of the rigid foam. Unless otherwise indicated, a furnace temperature of about 620° C. is selected in the following tests. The combustion of the samples often can be promoted by adding several drops of ethanol to the sample prior to the experiment.

Gas samples are taken beginning 4 minutes after the sample begins to flame and after 6 and 8 minutes. Samples are withdrawn from the chamber by syringe and injected on gas chromatographs that are configured for the analysis of specific gases. The output of the gas chromatographs are monitored by a Hewlett-Packard Model 5930 Automated Data System that is interfaced to a Hewlett-Packard 21 MX Central Processor for data analysis and storage.

The analysis of the DU chamber for oxygen, nitrogen, carbon monoxide, carbon dioxide and water has been adapted to a gas chromatograph system with automated sampling that uses a closed loop pumping system. A Gow Mac Model 150 gas chromatograph is set up with a Porapak Q column to analyze the effluent gases for carbon dioxide and water. The remaining gases are passed through a molecular sieve column and detected by a second thermal conductivity detector, (Gow Mac Model 10-470). This unit can detect all five gases at concentrations as low as 200 ppm for a 0.5 cc sample in a total analysis time of 2 minutes.

A second chromatograph is adapted for the analysis of hydrogen cyanide in the combustion products. The flame ionization detector (FID) on a Gow Max Model 750 is replaced by a home-made alkali flame ionization detector (AFID) that is tuned to eliminate any response to non-nitrogen containing hydrocarbons. The lower detection limit for hydrogen cyanide of 1 ppm is observed for this analytical method. The AFID is calibrated using a permeation system (Kin Tek Model 570, from Kin Tek Laboratories, Texas City, Tex.) equipped with a high level hydrogen cyanide permeation source.

Syringe samples for the analysis of hydrogen cyanide are withdrawn from the chamber 5 minutes after the sample begins to flame and also after 8 and 11 minutes. The automated gas chromatograph system for carbon monoxide, carbon dioxide and water withdraws samples every 2 minutes until the experiment is terminated.

Foam samples of Control A and Examples of the invention are subjected to the above testing, and the results of the analysis of the combustion products are summarized in Table III.

The combustion test results summarized in Table III show that when the cobalt, copper and manganese carboxylates are added to the urethane formulation containing Dabco, the presence of metal salt reduced the amount of hydrogen cyanide and carbon monoxide in the combustion products.

TABLE III

| Flaming Combustion Gas Analysis At 620° C. | | | |
|---|---|---|---|
| Product of | CO* | CO$_2$* | HCN* |
| Control A | 367 | 1340 | 12.8 |
| Example 6 | 78 | 1619 | 5.3 |
| Example 19 | 133 | 1777 | 4.6 |
| Example 20 | 73 | 1382 | 4.7 |
| Example 21 | 66 | 1705 | 5.0 |
| Example 22 | 65 | 1624 | 5.2 |

*Concentration in mg/g of polymer

The combustion gas characteristics of another group of polyurethane foam compositions prepared with a catalyst and a cobalt, copper, nickel or manganese salt in accordance with the invention are evaluated using a non-flaming degradation method at the U.S. Testing Company. The test utilizes a device consisting of a 20-liter oxidative pyrolysis chamber in which the foam is degraded; a 40-liter exposure chamber, suitable for animal response studies; a peristaltic pump which maintains a constant flow of combustion products into the exposure chamber; and several sampling ports for the removal of gases for analysis. The set-up is interfaced with a carbon monoxide analyzer, and hydrogen cyanide levels are determined by periodic removal of gas samples with a Dräger tube.

Before each experiment is begun, a 3.3"×3.3"×0.25" piece of foam is securely placed between two pieces of wire mesh. Concurrently, a heating panel, designed to produce a uniform energy level of 2.5 watts per sq. cm., is warmed and allowed to equilibrate. The test sample is then placed on the heating panel so that it receives the prescribed energy. The combustion chamber (20-liter) is sealed and the measurement of toxic fumes begins 45 seconds after placement of the foam sample on the heating panel. The CO output is constantly monitored by a CO analyzer and chart recorder, while HCN levels are obtained at six points during the experiment. Integrating under the concentration vs. time plots gives the total amount of each toxicant produced, measured in parts per million-minutes.

The results of the tests are summarized in Table IV.

TABLE IV

| Product of | HCN[1] | % Reduction[2] | CO[1] | % Reduction[2] |
| --- | --- | --- | --- | --- |
| Control C | 975 | — | 17,510 | — |
| Example 9 | 290 | 70.3 | 12,470 | 28.8 |
| Example 10 | 205 | 79.0 | 12,640 | 27.8 |
| Example 11 | 190 | 80.5 | 12,100 | 30.9 |
| Example 12 | 174 | 82.2 | 11,870 | 32.2 |
| Example 13 | 160 | 83.6 | 11,930 | 31.9 |
| Example 14 | 127 | 87.0 | 12,210 | 30.3 |
| Example 15 | 495 | 49.2 | 13,070 | 25.4 |
| Example 16 | 527 | 45.9 | 8,970 | 48.8 |
| Example 17 | 374 | 61.6 | 12,320 | 29.6 |
| Example 18 | 158 | 83.8 | 9,170 | 47.6 |

[1]In parts per million-minutes per gram of foam consumed
[2]Percent reduction based on Control C level The embodiments of the invention in which an exclusive property or privilege is claimed are defined as follows:

1. In the process of forming polyurethane compositions comprising reacting a mixture consisting essentially of an organic compound having two or more active hydrogen atoms, an organic polyfunctional isocyanate and a catalyst selected from the group consisting of tertiary phosphines, alkali and alkaline earth metal hydroxides, alkoxides and phenoxides, acidic metal salts of strong inorganic acids, metal alcoholates and phenolates, organometallic derivatives of trivalent and pentavalent arsenic, antimony and bismuth, metal carbonyls of iron and cobalt, one or more organic tertiary amines, and alkali or alkaline earth metal salts of aliphatic and alicyclic monocarboxylic acids, the improvement comprising the addition to said mixture prior to reaction, of a cobalt, copper, nickel or manganese salt of an aliphatic or alicyclic monocarboxylic acid containing from about 6 to 20 carbon atoms and free of other functional groups, or mixtures thereof in an amount effective to reduce the emission of toxic substances when the polyurethane composition is ignited.

2. The process of claim 1 wherein the compound having active hydrogen atoms is a hydroxyl group containing polyether or polyester.

3. The process of claim 2 wherein the polyether is a polyether polyol.

4. The process of claim 1 wherein the catalyst is an amine catalyst.

5. A polyurethane prepared in accordance with the process of claim 1.

6. In a process of forming a cellular polyurethane which comprises reacting a mixture consisting of an organic compound having active hydrogen atoms, an organic polyfunctional isocyanate and a catalyst selected from the group consisting of tertiary phosphines, alkali and alkaline earth metal hydroxides, alkoxides and phenoxides, acidic metal salts of strong inorganic acids, metal alcoholates and phenolates, organometallic derivatives of trivalent and pentavalent arsenic, antimony and bismuth, metal carbonyls of iron and cobalt, one or more organic tertiary amines, and alkali or alkaline earth metal salts of aliphatic and alicyclic monocarboxylic acids, the improvement comprising the addition to said mixture prior to reaction, of a cobalt, copper, nickel or manganese salt of an aliphatic or alicyclic monocarboxylic acid containing from about 6 to 20 carbon atoms and free of other functional groups, in an amount effective to reduce the emission of toxic substances when the cellular polyurethane is ignited.

7. The process of claim 6 wherein the mixture also contains a small amount of water, hydrocarbon or halocarbon as a blowing agent.

8. The process of claim 6 wherein the active hydrogen compound is a hydroxyl group containing polyether or polyester.

9. The process of claim 6 wherein the catalyst is a tertiary amine.

10. The process of claim 6 wherein the aliphatic or alicyclic monocarboxylic acid contains from about 7 to 12 carbon atoms.

11. The process of claim 6 wherein the cobalt copper, nickel or manganese salt is used in an amount of about 0.05 to about 3 parts by weight of the metal per 100 parts by weight of active hydrogen compound.

12. A cellular polyurethane prepared in accordance with the process of claim 6.

13. In the process of forming polyurethane compositions comprising reacting a mixture consisting essentially of an organic compound having two or more active hydrogen atoms, an organic polyfunctional isocyanate and a catalyst selected from the group consisting of tertiary phosphines, alkali and alkaline earth metal hydroxides, alkoxides and phenoxides, acidic metal salts of strong inorganic acids, metal alcoholates and phenolates, organometallic derivatives of trivalent and pentavalent arsenic, antimony and bismuth, metal carbonyls of iron and cobalt, one or more organic tertiary amines, and alkali or alkaline earth metal salts of aliphatic and alicyclic monocarboxylic acids, the improvement comprising the addition to said mixture prior to reaction, of a cobalt, copper, nickel or manganese salt of an overbased salt metal organic composition consisting essentially of a metal oxide and a hydroxyl-metal-carboxylate or -sulfonate complex wherein the metal content is in chemical combination partly with oxygen in a polynuclear metal oxide crystallite core and partly with at least two different aliphatic or alicyclic monocarboxylic acids or a mixture of one or more aliphatic or alicyclic monocarboxylic and aliphatic or aromatic monosulfonic acids containing at least two carbon atoms as hydroxy-metal-carboxylate and hydroxy-metal-sulfonate groups, at least one of the acids being a monocarboxylic acid containing at least seven carbon atoms, and when the second acid is also a monocarboxylic acid, the second acid contains a number of carbon atoms in its longest chain differing by at least two carbon atoms from the total number of carbon atoms in the other, at least a portion of the carboxylate and sulfonate groups being hydrogen bonded to oxygen atoms of the core, and the remainder of the carboxylate and sulfonate groups are unbonded and in equilibrium with the bonded groups, and the ratio of total metal moles to the total moles of organic acid is greater than one in an amount effective to reduce the emission of toxic substances when the polyurethane composition is ignited.

14. The process of claim 13 wherein the compound having active hydrogen atoms is a hydroxyl group containing-polyether or polyester.

15. The process of claim 14 wherein the polyether is a polyetherpolyol.

16. The process of claim 13 wherein the catalyst is an amine catalyst.

17. A polyurethane prepared in accordance with the process of claim 13.

18. In a process of forming a cellular polyurethane which comprises reacting a mixture consisting of an organic compound having active hydrogen atoms, an organic polyfunctional isocyanate, a blowing agent and a catalyst selected from the group consisting of tertiary phosphines, alkali and alkaline earth metal hydroxides, alkoxides and phenoxides, acidic metal salts of strong inorganic acids, metal alcoholates and phenolates, organometallic derivatives of trivalent and pentavalent arsenic, antimony and bismuth, metal carbonyls of iron and cobalt, one or more organic tertiary amines, and alkali or alkaline earth metal salts of aliphatic and alicyclic monocarboxylic acids, the improvement comprising the addition to said mixture prior to reaction, of a cobalt, copper, nickel or manganese salt of an overbased metal organic composition consisting essentially of a metal oxide and a hydroxyl-metal-carboxylate or -sulfonate complex wherein the metal content is in chemical combination partly with oxygen in a polynuclear metal oxide crystallite core and partly with at least two different aliphatic or alicyclic monocarboxylic acids or a mixture of one or more aliphatic or alicyclic monocarboxylic and aliphatic or aromatic monosulfonic acids containing at least two carbon atoms as hydroxy-metal-carboxylate and hydroxy-metal-sulfonate groups, at least one of the acids being a monocarboxylic acid containing at least seven carbon atoms, and when the second acid is also a monocarboxylic acid, the second acid contains a number of carbon atoms in its longest chain differing by at least two carbon atoms from the total number of carbon atoms in the other, at least a portion of the carboxylate and sulfonate groups being hydrogen bonded to oxygen atoms of the core, and the remainder of the carboxylate and sulfonate groups are unbonded and in equilibrium with the bonded groups, and the ratio of total metal moles to the total moles of organic acid is greater than one in an amount effective to reduce the emission of toxic substances when the polyurethane composition is ignited.

19. The process of claim 18 wherein the blowing agent is water, a hydrocarbon or a halocarbon.

20. The process of claim 18 wherein the active hydrogen compound is a hydroxyl group containing-polyether or polyester.

21. The process of claim 18 wherein the catalyst is a tertiary amine.

22. The process of claim 13 wherein the cobalt, copper, nickel or manganese salt is used in an amount of about 0.05 to about 3 parts by weight of the metal per 100 parts by weight of active hydrogen compounds.

23. A cellular polyurethane prepared in accordance with the process of claim 18.

24. In the process of forming polyurethane compositions comprising reacting a mixture consisting essentially of an organic compound having two or more active hydrogen atoms, an organic polyfunctional isocyanate and a catalyst selected from the group consisting of tertiary phosphines, alkali and alkaline earth metal hydroxides, alkoxides and phenoxides, acidic metal salts of strong inorganic acids, metal alcoholates and phenolates, organometallic derivatives of trivalent and pentavalent arsenic, antimony and bismuth, metal carbonyls of iron and cobalt, one or more organic tertiary amines, and alkali or alkaline earth metal salts of aliphatic and alicyclic monocarboxylic acids, the improvement comprising the addition to said mixture prior to reaction, of a basic cobalt, copper, nickel or manganese salt of an aliphatic or alicyclic monocarboxylic acid or mixtures thereof in an amount effective to reduce the emission of toxic substances when the polyurethane composition is ignited.

25. The process of claim 24 wherein the compound having active hydrogen atoms is a hydroxyl group containing-polyether or polyester.

26. The process of claim 25 wherein the polyether is a polyetherpolyol.

27. The process of claim 24 wherein the aliphatic or alicyclic monocarboxylic acid contains up to about 20 carbon atoms.

28. The process of claim 24 wherein the catalyst is an amine catalyst.

29. The process of claim 24 wherein the mixture also contains a blowing agent and the polyurethane composition formed in the process is a cellular polyurethane.

30. The process of claim 29 wherein the blowing agent is a small amount of water, hydrocarbon or halocarbon.

* * * * *